Sept. 30, 1947  G. H. PALM  2,428,035
HYDRAULICALLY CONTROLLED DISPENSING PUMP
Filed June 16, 1943  5 Sheets-Sheet 1
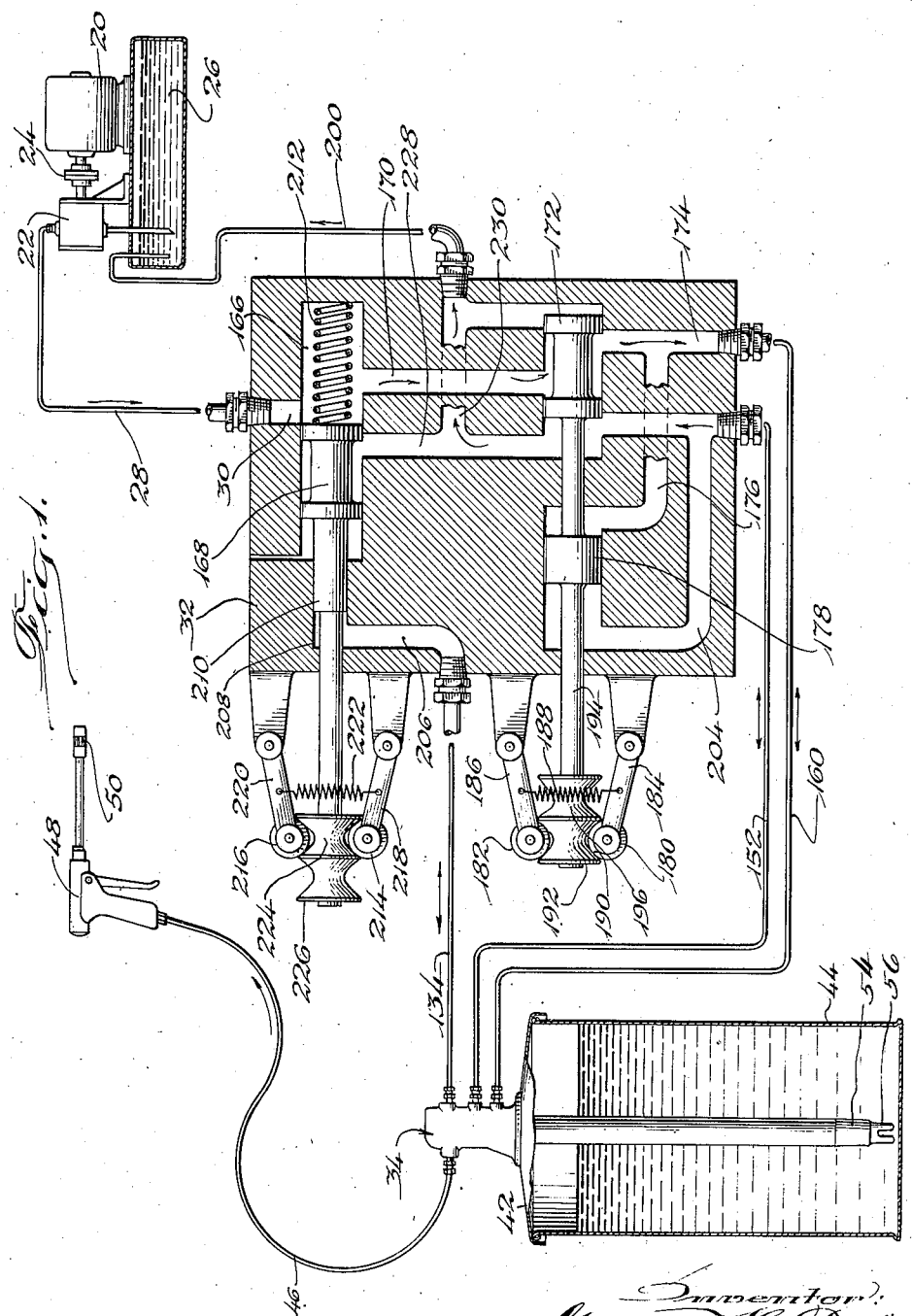

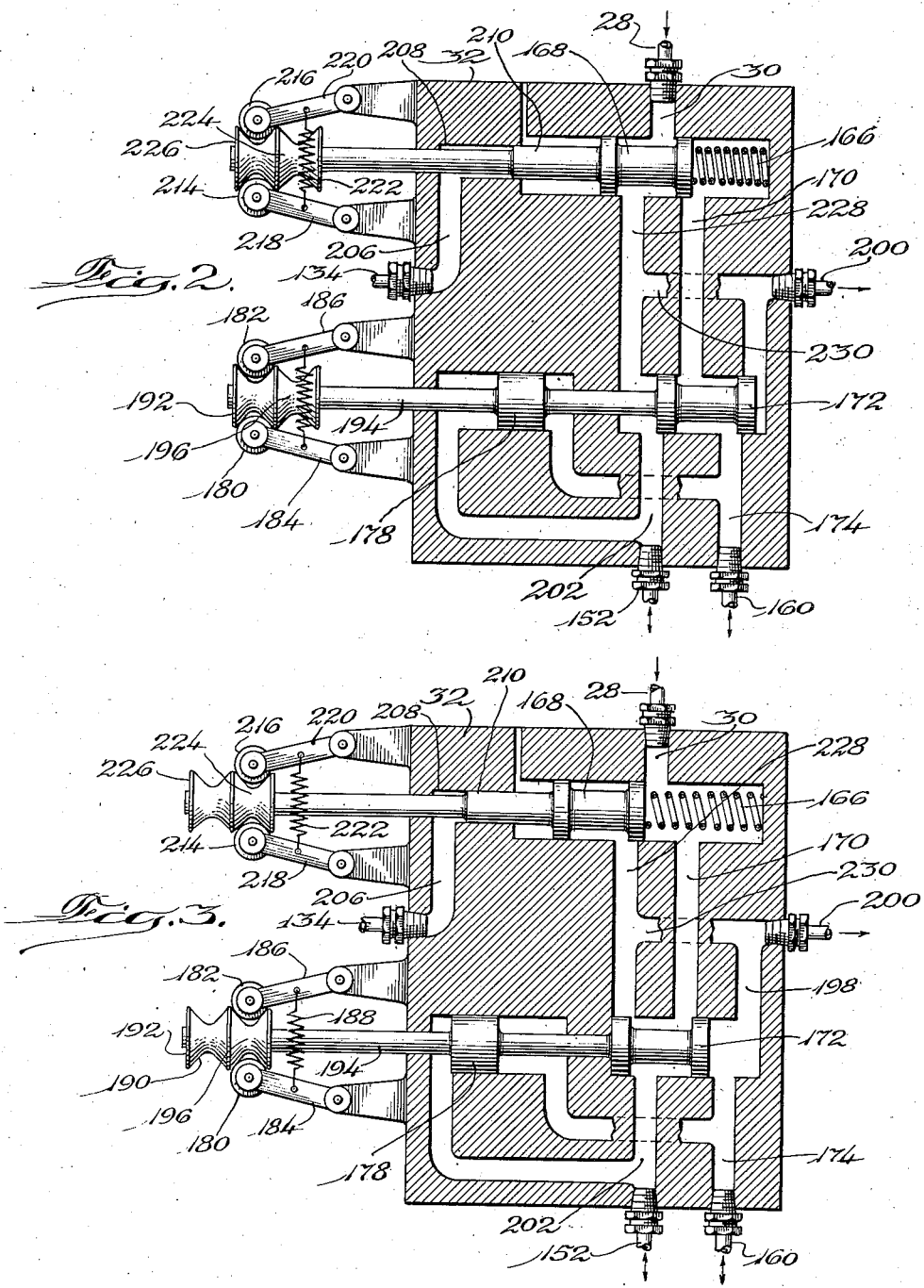

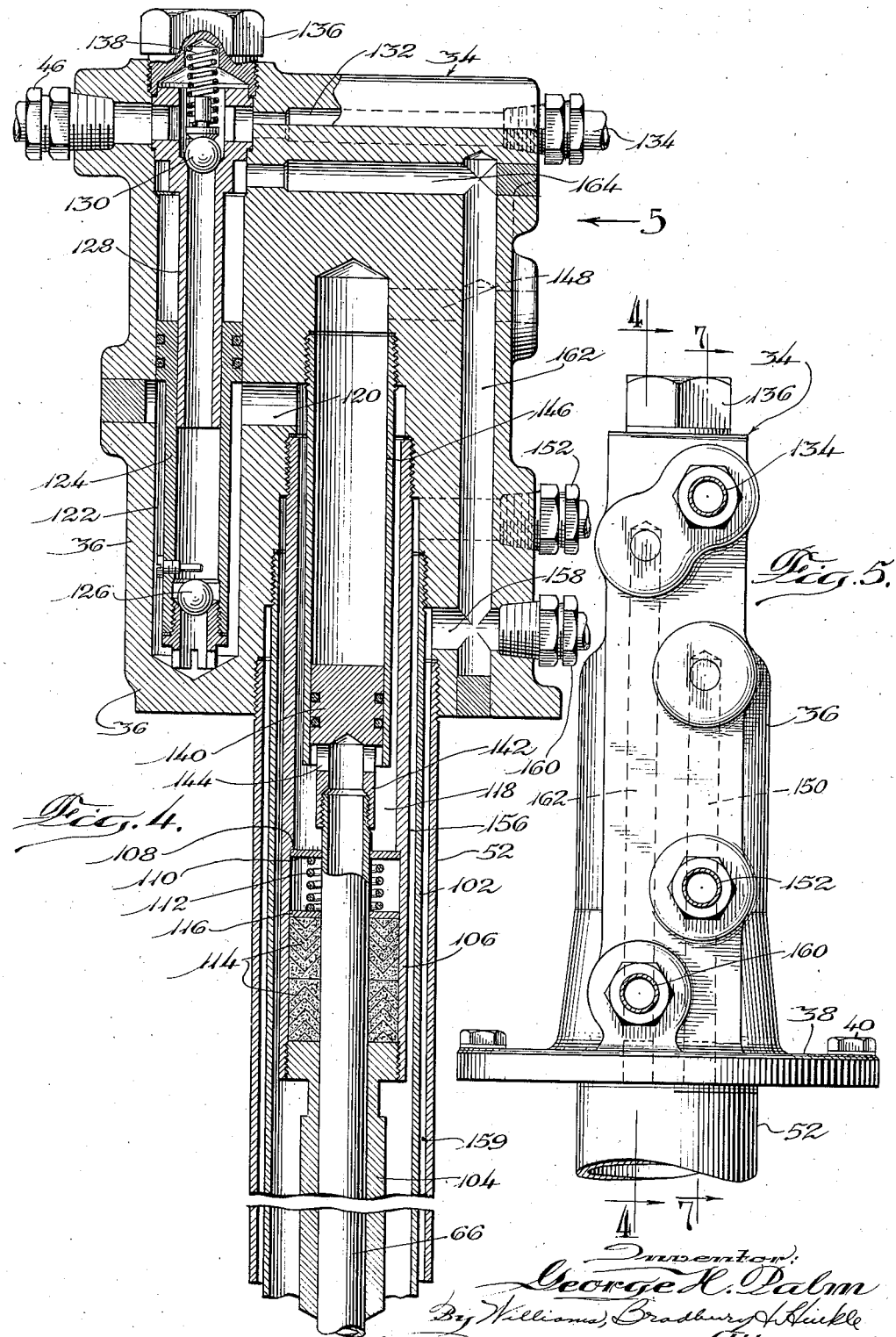

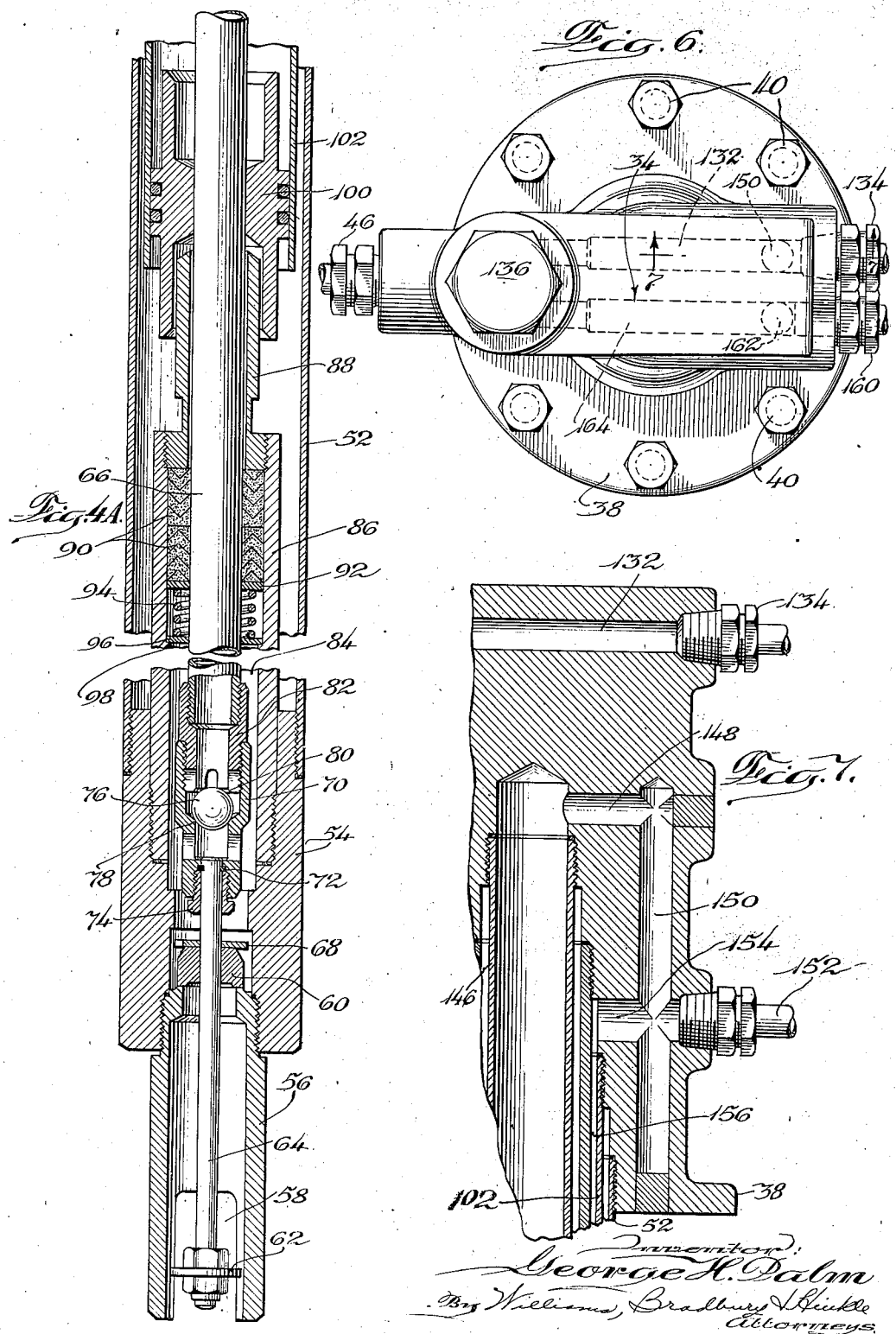

Sept. 30, 1947        G. H. PALM        2,428,035
HYDRAULICALLY CONTROLLED DISPENSING PUMP
Filed June 16, 1943        5 Sheets-Sheet 5
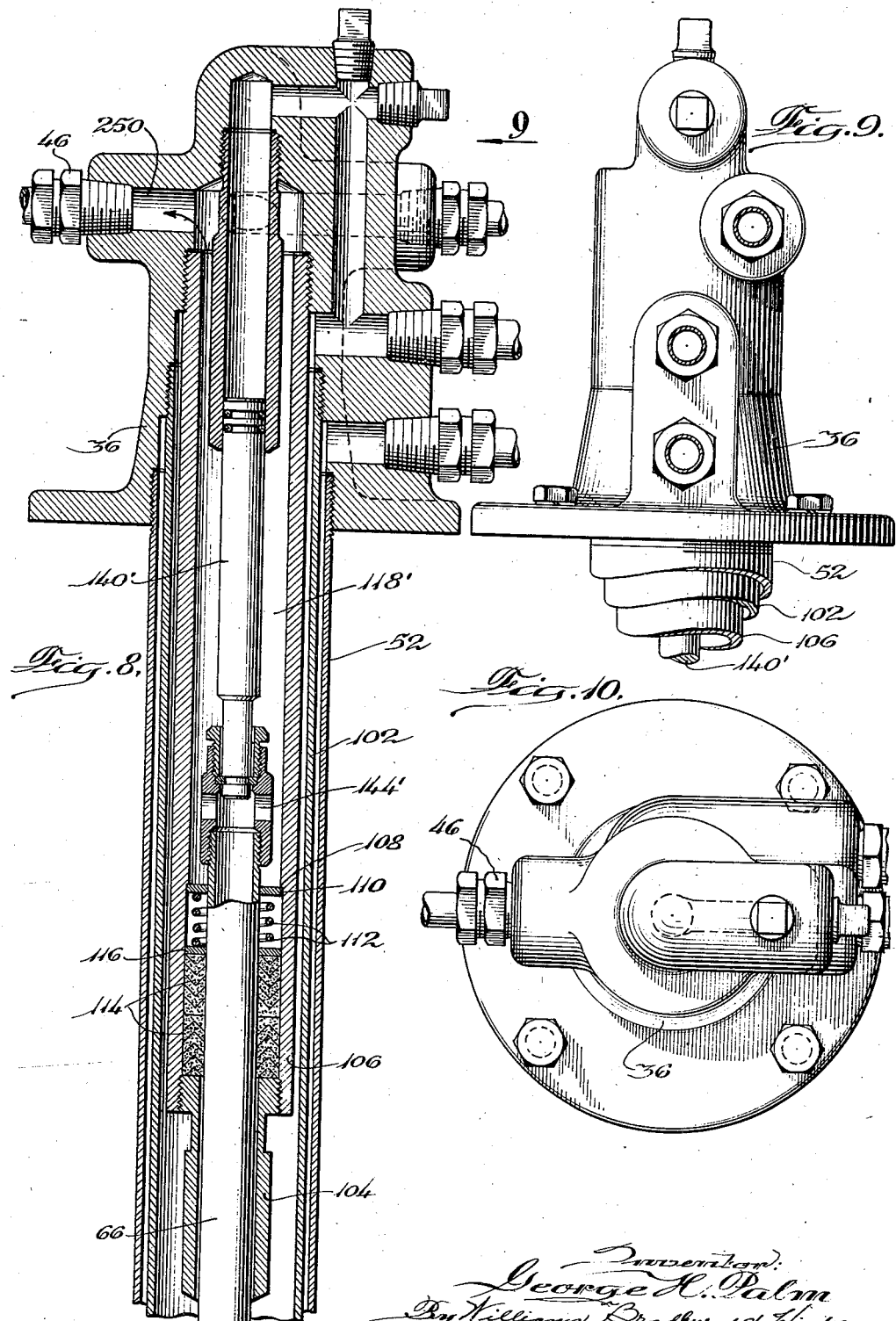

Patented Sept. 30, 1947

2,428,035

UNITED STATES PATENT OFFICE 2,428,035

HYDRAULICALLY CONTROLLED DISPENSING PUMP

George H. Palm, Chicago, Ill., assignor to Stewart-Warner Corporation, Chicago, Ill., a corporation of Virginia Application June 16, 1943, Serial No. 491,005

14 Claims. (Cl. 222—253)

My invention relates to lubricating systems and more particularly to power operated lubricating systems of the kind used in garages and service stations to lubricate the bearings of automobiles and similar vehicles.

In present automotive practice it is usual to equip the chassis bearings of automobiles with lubricant receiving nipples or fittings and to lubricate these bearings by attaching the coupler of a lubricant compressor successively to the various fittings located at different points on the automobile chassis. The lubricant compressors used for this purpose are sometimes manually operated and sometimes operated by electricity or compressed air.

Most of the bearings of an automobile offer only moderate resistance to the in-flow of lubricant and a lubricant pressure of 3,000 pounds per square inch is adequate to lubricate practically all of the bearings encountered. Occasionally, however, a stiff or tight bearing may be encountered which requires the use of pressures up to seven or eight thousand pounds per square inch and it is usual to make power operated lubricating systems which are capable of providing the 7,000 or 8,000 pounds pressure necessary to lubricate such occasional bearings.

This means that all of the parts of the lubricating system must be made strong enough to withstand this 7,000 or 8,000 pounds pressure and that an electric or air operated pump must be capable of producing these high pressures. All of this greatly increases the expense of the lubricating system and reduces its efficiency by reducing the volume of lubricant discharged, since the amount of lubricant which can be discharged by a motor operated pump capable of delivering lubricant under 7,000 or 8,000 pounds pressure is much less than can be discharged by a similar pump using the same size motor but designed to deliver lubricant under not more than 3,000 pounds pressure.

An object of my invention is to provide a new and improved lubricating system wherein the motor driven pumps are designed for a pressure of about 3,000 pounds per square inch, but which is provided with an automatic booster for increasing the lubricant pressure to 7,000 or 8,000 pounds per square inch when the bearing resistance makes such a lubricant pressure necessary for proper lubrication. The lubricating system disclosed and claimed in this application is an improvement on that disclosed and claimed in my prior application, Serial No. 485,097, filed April 30, 1943.

Another object of my invention is to provide a new and improved lubricating system which is simple and inexpensive to install and operate and which may be applied directly to the drums in which lubricant is commonly shipped so that the lubricant is dispensed from the drum to the bearing without coming in contact with dirt, water, or other contaminating substances.

Another object of my invention is to provide a new and improved lubricating system which is particularly adapted for lubricating bearings in which the pressures required for adequate lubrication never exceed 3,000 pounds per square inch.

Another object of my invention is to provide a new and improved pressure control valve.

Another object of my invention is to provide a new and improved reversing valve for reversing the direction of application of the primary actuating fluid to a lubricant compressor.

Another object of my invention is to provide a new and improved lubricant compressor.

Another object of my invention is to provide a new and improved lubricant compressor having a booster as an integral part thereof.

Other objects and advantages will become apparent as the description proceeds.

In the drawings:

Fig. 1 is a diagrammatic representation of a preferred form of lubricating system embodying my invention;

Fig. 2 is a cross section through the reversing and pressure control valves showing the pressure control valve in a different position from that shown in Fig. 1;

Fig. 3 is a view similar to Fig. 2, but showing the valve parts in different positions;

Fig. 4 is a longitudinal, sectional view of the upper part of a preferred form of lubricant compressor and is taken on the line 4—4 of Fig. 5;

Fig. 4A is a longitudinal, sectional view of the lower part of a preferred form of lubricant compressor, this view being taken on the same line as Fig. 4 and in effect constituting a continuation of that figure;

Fig. 5 is a side elevation of the upper part of the compressor shown in Fig. 4 and is taken looking in the direction of the arrow 5 of that figure;

Fig. 6 is a top plan view of the compressor of Figs. 4 and 4A;

Fig. 7 is a partial, transverse section taken on the line 7—7 of Figs. 5 and 6;

Fig. 8 is a view similar to Fig. 4, but showing a modified form of my invention. The lower portion of this modified form of my invention may be identical with that shown in Fig. 4A.

Fig. 9 is a side elevation of the upper part of the modification shown in Fig. 8 and is taken looking in the direction of the arrow 9 of that figure; and Fig. 10 is a top plan view of the modification of Fig. 8.

The diagrammatic representation constituting Fig. 1 of the drawings is intended merely to indicate a typical installation embodying my invention and is not to be construed as meaning that my invention is limited to the particular primary pumping means shown in this figure. In the embodiment of my invention represented by this figure, an electric motor 20 drives a gear pump or any other suitable type of pump 22 through a flexible coupling 24.

The pump 22 is supplied with a primary fluid, such as a light turbine oil, or any other suitable liquid, from a reservoir 26 which may be located in unitary relationship to the pump and motor, as shown, or may be placed in any other suitable position. The particular arrangement of the pump, reservoir and motor illustrated in Fig. 1 merely forms a convenient unitary assembly which can be positioned in any desired location in a garage or service station.

The primary fluid discharged by the pump 22 flows through a pipe 28 to the inlet 30 of a casting 32 having associated therewith both a lubricant pressure operated bypass valve for the primary fluid and a reversing valve for reversing the direction of flow of the primary fluid to and from the lubricant compressor indicated generally by reference character 34.

Referring to Figs. 4 and 5, it will be seen that the compressor 34 has a head 36 of cast iron, or other suitable material, terminating at its lower end in a flange 38 provided with screws 40 for attachment to a cover 42 (Fig. 1), having a size suitable for closing the upper end of a lubricant drum 44. When the compressor is applied to a lubricant drum, as shown in Fig. 1, the lower or inlet end of the compressor is located just above the bottom of the drum. The compressor 34 discharges lubricant through a hose 46 leading to a control valve 48 provided with a coupler 50 for temporary attachment to a lubricant fitting or nipple permanently mounted on a chassis bearing of an automobile or other vehicle. The control valve 48 may be of the type disclosed and claimed in my co-pending application, Serial No. 454,667, filed August 13, 1942, now Patent No. 2,380,608, dated July 31, 1945.

In addition to the head or casting 36, the compressor comprises a sleeve 52 which connects the head 36 with a second casting 54 (Fig. 4A) adapted to be located well down into the drum 44 and carrying a cylindrical extension 56 which forms the lubricant inlet for the compressor. The extension 56 has openings 58 in its side walls adjacent the lower end thereof and lubricant entering these openings is fed upwardly past an inlet check valve 60 by a feeder 62 comprising an annular washer having a loose fit in the extensions 56 and mounted on a reciprocating rod 64 attached to the lower end of a tube 66.

The check valve 60 is located in the lower end of the casting 54 and is guided therein by a triangular member 68 which limits lateral movement of the valve 60. The rod 64 extends through the valve 60 and member 68 and is secured to the lower end of a valve housing 70 by a split ring 72 and tubular nut 74. The valve housing 70 contains a ball valve 76 having a valve seat 78. Upward movement of the ball valve 76 from this seat 78 is limited by fingers 80 provided by the lower end of a union 82 which connects the valve housing 70 with the lower end of tube 66.

The valve housing 70, union 82, lower end of tube 66 and upper end of rod 64 are located in and reciprocable lengthwise of a lower pumping chamber 84 formed partly by the casting 54 and partly by a tubular member 86 whose lower end is threadedly attached to this casting. The upper end of the tubular member 86 is closed by a sleeve 88 surrounding the tube 66 and forming an abutment against which packing rings 90 are urged by washer 92 and spring 94. The spring 94 rests upon a metal annulus 96 supported on a shoulder 98 provided by tubular member 86. The function of the packing rings 90 is to prevent escape of lubricant between the upper end of the tubular member 86 and tube 66 as the latter reciprocates in a manner hereinafter described.

A double acting piston 100 is affixed to an intermediate portion of the tube 66. This piston reciprocates within a cylinder 102 whose upper end is threaded into the head 36. Downward movement of piston 100 and tube 66 is limited by engagement of the piston 100 with the upper end of sleeve 88. Upward movement of piston 100 and tube 66 is limited by engagement of the piston 100 with a second sleeve 104 threaded into the lower end of a tubular member 106 whose upper end is threaded into the head 36. The tubular member 106 provides a shoulder 108 forming a support for a ring 110. This ring 110 constitutes the abutment for a spring 112 which compresses packing rings 114 between washer 116 and the upper end of sleeve 104 to prevent leakage of lubricant between the tube 66 and tubular member 106.

This tubular member 106 provides an upper pumping chamber 118. The upper end of the pumping chamber 118 communicates through port 120 with a booster chamber 122 containing a tubular piston 124 having a check valve 126 preventing reverse flow of lubricant therethrough. A stationary tubular member 128 is in telescopic engagement with the piston 124 and a spring pressed check valve 130 controls communication between the interior of this tubular member and the lubricant discharge conduit 46.

This same check valve 130 also controls communication between the interior of tubular member 128 and a passage 132 formed in the head 36 and communicating with a pipe 134 leading to the valve casting 32 whereby the lubricant pressure in the lubricant discharge conduit is communicated to the lubricant pressure operated valve means which controls the bypass for the primary fluid. The tubular member 128 is held in place by a threaded plug 136 which also forms an abutment for the spring 138 of the check valve 130.

A single acting piston 140 is attached to the upper end of the tube 66 by a neck 142 having ports 144 which provide communication between the interior of the tube 66 and the upper pumping chamber 118. This single acting piston 140 slides in a cylinder 146 whose upper end is threaded into the head 36. As best shown in Fig. 7, the upper end of cylinder 146 is connected by bores 148 and 150 with a primary fluid pipe 152 leading to the valve block 32. A third bore 154 connects this same primary fluid pipe 152 with the annular passage 156 formed between the cylinder 102 and tubular member 106 and serving to admit primary fluid to the upper side of the double acting piston 100.

Primary fluid is admitted to the lower side of the double acting piston 100 by way of annular passage 159 formed between cylinder 102 and sleeve 52, bore 158 and pipe 160 connecting head 36 with valve block 32. Primary fluid pipe 160 is also connected to the upper end of the booster chamber 122 by way of bores 162 and 164. When the valve mechanisms are in the position shown in Fig. 1 and the parts of the lubricant compressor are in the position shown in Figs. 4 and 4A, primary fluid delivered by pump 22 flows through pipe 28 and port 30 into the righthand end of the valve chamber 166 of the lubricant pressure operated bypass valve 168.

The primary fluid flows freely through this valve chamber into passage 170, around the reduced portion of the reversing valve 172, through bore 174, pipe 160, bore 158 and annular passage 159 to the lower side of the piston 100. A feature of my invention lies in the fact that the primary fluid pump 22 develops only a nominal pressure such as 500 pounds per square inch, so that the piping connections for the primary fluid can be made of relatively inexpensive material and by relatively inexpensive manufacturing methods.

The force exerted by the primary fluid on the lower end of piston 100 causes this piston and tube 66 attached thereto to move upwardly, the cylinder 102 above the piston 100 being evacuated for this purpose through the annular passage 156, the bore 154, the pipe 152, bores 202, 228 and 230 in the casting 32, and a pipe 200 leading to the reservoir 26. This upward movement of the tube 66 carries with it the piston 140 and rod 64 and since the piston 140 has a cross section larger than the tube 66, the lubricant capacity of chamber 118 is increased by this upward movement.

The lubricant capacity of chamber 84 is also increased since tube 66 has a greater cross section than rod 64. As tube 66 is common to both pumping chambers, the effective enlargement of these chambers is represented by the difference in cross section between the rod 64 and the piston 140. Lubricant can flow upwardly through tube 66 from the lower pumping chamber to the upper pumping chamber and as this tube and rod 64 move upwardly, feeder 62 forces additional lubricant past valve 60 into the lower pumping chamber 84.

When piston 100 engages the lower end of stationary sleeve 104, the piston can move no farther and the pressure in the primary fluid line between this piston and the pump 22 builds up to a maximum. This primary fluid line is connected by a bore 176 in the casting 32 (Fig. 1) with the righthand side of a piston 178 attached to the reversing valve 172. Just before this primary fluid pressure reaches the maximum which the pump 22 is capable of delivering, the force exerted by the primary fluid on the piston 178 shifts the valve 172 from the position shown in Fig. 1 to that shown in Fig. 3. In effecting this shift of the valve 172, the force exerted by the primary fluid on the piston 178 was sufficient to overcome the resistance to movement of the valve offered by the rollers 180 and 182 mounted, respectively, on the ends of pivoted arms 184 and 186 and urged by a spring 188 into engagement with the end groove 190 in a spool 192 attached to the end of the valve stem 194. In this movement of the piston 178, the oil immediately to the left of the piston is forced out through a bore 204 in the casting 32 and the communicating bores 202 and 230 which open into said pipe 200 leading to the reservoir 26. After the reversing valve has shifted to the position shown in Fig. 3, the rollers 180 and 182 engage a second groove 196 in the spool 192 and tend to hold the valve in the position shown in this figure.

When the reversing valve 172 is in the position shown in Fig. 3, the primary fluid pipe 160 which communicates with the lower end of the double acting piston 100 is connected by way of bores 174 and 198 in the casting 32 to a primary fluid return pipe 200 leading to the reservoir 26. At the same time, in the changed positions of the parts, primary fluid from the pump 22 flows through pipe 28, port 30, valve chamber 166, bore 170, around the reduced portion of reversing valve 172, through bore 202 and pipe 152 to head 34. Here part of the primary fluid flows through bores 150 and 148 to the upper side of single acting piston 140. The remainder of the primary fluid flows through bore 154 and annular passage 156 to the upper end of the double acting piston 100.

The primary fluid acting on the upper ends of pistons 100 and 140 causes these pistons and tube 66 to move downwardly, thereby displacing lubricant from both pumping chambers 84 and 118. The lubricant displaced from the lower chamber flows upwardly through the tube 66 and passes through ports 144 into the upper chamber. The combined lubricant discharge from both chambers flows through port 120 into that part of booster chamber 122 which is below the upper end of tubular piston 124. The upper end of the booster chamber is connected by bores 164 and 162 to pipe 160 which, in turn, is connected through the valve block 32 with the return pipe 200 leading to the reservoir 26.

The lubricant discharged into the booster chamber from the pumping chambers can flow freely past the check valve 126 in the booster piston, but passage of this lubricant into the discharge conduit 46 is opposed by the spring pressed check valve 130 and by any pressure existing in the discharge conduit. If this pressure in opposition to the flow of the lubricant is not more than about 3,000 pounds per square inch, the lubricant is forced outwardly through the conduit 46 with little or no movement of the booster piston 124. If, however, the pressure in opposition to the lubricant exceeds the pressure developed by the pistons 100 and 140, the booster piston moves upwardly, thereby closing check valve 126 and forcing lubricant past the check valve 130 under a pressure several times greater than the pressure of the lubricant discharged from the pumping cylinders. The parts of the booster and pumping mechanisms may be given any desired dimensions so that the lubricant discharged may attain a pressure many times that of the primary fluid. The particular apparatus illustrated in Figs. 1 to 7 of the drawings is designed to deliver lubricant under a maximum pressure of approximately 8,000 pounds per square inch with a primary fluid pressure of 500 pounds per square inch, giving a pressure multiplication of 16 to 1.

As will be readily understood, the reason why the booster piston 124 is effective for producing increased pressure is that the entire bottom face of the piston is subjected to the pressure of the grease in the chamber 122, whereas this pressure is transmitted to the grease over an area of substantially smaller size. It is clear also that during the upward movement of the booster piston 124, the downward movement of the pistons 100 and 140 and the tube 66 is very substantially slowed down, such retarded movement continuing until the abnormal opposition to the movement of the grease has been overcome.

The movement of the booster piston 124 upwardly during the downward movement of the pistons 100 and 140 in their power strokes is permitted by reason of the fact that during such downward movement of the pistons 100 and 140, with the valve 172 in the valve head 32 in the position shown in Fig. 3, the space about the tubular member 128 above the piston 124 is connected by the bores 164 and 162 with the pipe 160 for the escape of the oil from such space to the reservoir 26.

When the piston 100 engages the lower stationary sleeve 88, further movement of this piston and its associated parts is prevented and the pressure in the primary fluid line connecting the upper side of this piston and the upper side of the piston 140 with the pump 22 increases. This pressure is communicated to the lefthand side of the reversing valve piston 178 by way of a duct 204 and just before this pressure reaches the maximum which the pump 22 can create, valve 172 is shifted back to the position shown in Fig. 1. This reverses the direction of flow of the primary fluid in the pipes 152 and 160 and initiates another upward or suction stroke of the pumping mechanism. At the same time primary fluid is delivered to the upper side of the booster piston 124 by way of bores 162 and 164, thereby returning this booster piston to the lower position shown in Fig. 4.

In the normal use of my novel lubricating system, the pump 22 operates continuously and the pumping mechanism continues to operate the pistons 100 and 140 until the pressure in the lubricant discharge conduit 46 attains a predetermined maximum which operates the primary fluid bypass valve 168, as when the control valve 48 of the conduit 46 is closed. Passage 132 in head 36 and pipe 134 transmit the lubricant pressure in the discharge conduit 46 to a duct 206 leading to the cylinder 208 containing a piston 210 attached to the valve 168. During the operation of the pumping mechanism the valve 168 is held in the position shown in Fig. 1 by the force of a spring 212 and the resistance of the rollers 214 and 216 mounted, respectively, on pivoted arms 218 and 220 and urged by a spring 222 into engagement with the righthand groove 224 in a spool 226.

When the lubricant pressure in the discharge conduit attains a predetermined maximum, which happens in every instance when the control valve 48 is closed, piston 210 moves valve 168 to the position shown in Fig. 2 and in this position the primary fluid delivery through pipe 28 to port 30 flows around the reduced portion of valve 68 and through bores 228 and 230 to the return pipe 200 leading back to the reservoir 26. This releases all primary fluid pressure on the pump pistons 100 and 140 and on the booster piston 124 so that these pistons come to rest while the pump 22 continues to operate. As soon as the pressure in the lubricant discharge conduit 46 drops, as by opening control valve 48, spring 212 returns valve 168 to the position shown in Fig. 1 and operation of the pumping mechanism is resumed.

From the foregoing description, it will be apparent that in Figs. 1 to 7, inclusive, of the drawings I have shown a lubricating system having a single acting pumping mechanism or lubricant compressor provided with an automatic booster which comes into action when necessary, and wherein the power operated pump delivers primary fluid ordinarily at a relatively low pressure, although the lubricant can be delivered to the bearing at a substantially higher pressure by the automatic action of the booster when necessary. The connections between the power driven pump and the lubricant compressor can accordingly be made of inexpensive parts formed of inexpensive materials by conventional manufacturing processes and machinery. High pressure is limited to a comparatively small proportion of the parts which may be made of higher grade materials.

In Figs. 8, 9 and 10, I have shown a modified form of my invention utilizing a somewhat different lubricant compressor which is not provided with a booster mechanism. This compressor has the same lower structure as the compressor of the previous embodiment so that Fig. 4A is common to both forms of my invention as are also Figs. 1, 2 and 3. In addition to eliminating the booster, the embodiment of Fig. 8 differs from that of Fig. 4 principally in that the compressor of Fig. 8 discharges lubricant on both strokes of the pumping mechanism, whereas the embodiment of Fig. 4 discharges lubricant only on one stroke.

Referring to Fig. 8, it will be seen that the piston 140' attached to the upper end of the tube 66 is of smaller diameter than the tube 66 so that upward movement of this piston and tube discharges lubricant from the upper pumping chamber 118' through port 250 into lubricant discharge conduit 46. Check valve 76 in the housing 70 attached to the lower end of the tube 66 prevents reverse flow of lubricant through this tube 66 from the upper to the lower pumping chambers. During the upward stroke of the tube 66, lubricant is forced into the lower pumping chamber 84 as in the previous embodiment and during the following down stroke lubricant from the lower pumping chamber is forced through tube 66 through the upper pumping chamber where it enters by way of ports 144'. The quantity of lubricant discharged by the lower pumping chamber during the downward stroke of the tube 66 is more than sufficient to satisfy the increasing capacity of the upper pumping chamber 118' so that some lubricant is discharged through port 250 into discharge hose 46 during the downward stroke of the tube 66.

While the compressor of Fig. 8 discharges lubricant on both strokes, the total quantity discharged for a complete cycle is the difference in diameter between the rod 64 and piston 140' multiplied by the length of stroke. As the piston 140' is of smaller diameter than the piston 140, the quantity of lubricant discharged by the compressor of Fig. 8 for a given length of stroke is less than that discharged by the compressor of Fig. 4.

On the other hand, the pumping chambers 84 and 118' of the modified compressor of Fig. 8 are capable of discharging lubricant at higher pressures than the pumping chambers 84 and 118 of Fig. 4, so that the compressor of Fig. 8 requires no booster. The structure of Fig. 8 is particularly advantageous where only moderate pressures are required, although this compressor can be designed to provide any desired pressure by varying the dimensions of the essential parts of the pumping mechanism.

While I have shown and described only two embodiments of my invention, it is to be understood that my invention may assume numerous other forms and includes all modifications and variations coming within the scope of the appended claims.

I claim:

1. A lubricating system, comprising a primary pump for supplying primary fluid at relatively low pressure, a lubricant compressor comprising a part movable by said primary fluid alternatively in opposite directions for forcing lubricant from said compressor, a reversing valve mechanism interposed in the connections between said primary pump and said lubricant compressor for shifting the pressure of said primary fluid from one side of said movable part to the other side, a discharge conduit for said lubricant compressor, a control valve for regulating discharge of lubricant through said conduit, and a bypass valve for said primary fluid responsive directly to pressure variations in said discharge conduit for relieving the pressure of said primary fluid on said movable part.

2. A lubricating system of the class described, comprising a primary fluid reservoir, a pump supplied from said reservoir, a motor for driving said pump, a valve block, a conduit connecting said pump and valve block, a second conduit connecting said valve block and reservoir, a bypass valve in said valve block for establishing communication between said conduits for idling operation of said pump, a lubricant compressor comprising a part movable by said primary fluid alternatively in opposite directions for forcing lubricant from said compressor, a pair of conduits connecting said valve block with said compressor, reversing valve mechanism in said valve block for alternately connecting each of said last-named conduits with each of said first-named conduits for shifting the pressure of said primary fluid from one side of said movable part to the other side, a lubricant discharged conduit for said compressor, and means responsive to pressure variations in said discharge conduit for shifting said bypass valve and adapted when a predetermined maximum pressure is reached to move the bypass valve to position for causing the pump to idle.

3. A lubricating system of the class described, comprising a primary fluid pump, a lubricant compressor operated by primary fluid discharged from said pump, said compressor having piston means therein, conduit connections between said compressor and pump for supplying primary fluid to opposite sides of said piston means, an automatic reversing valve for reversing the direction of application of primary fluid to said piston means for forcing lubricant from the compressor, and automatic booster means in said compressor adapted substantially to increase the pressure applied upon the lubricant when necessary for overcoming the resistance to the flow of the lubricant from the compressor.

4. A lubricating system of the class described, comprising a primary fluid pump, a lubricant compressor operated by primary fluid discharged from said pump, said compressor having piston means therein, conduit connections between said compressor and pump for supplying primary fluid to opposite sides of said piston means, an automatic reversing valve for reserving the direction of application of primary fluid to said piston means for forcing lubricant from the compressor, a booster for said compressor for increasing the pressure applied on the lubricant for ejecting it, and means for conducting primary fluid to one side of said booster for returning it to normal position after an operative stroke.

5. A lubricating system, comprising a lubricant compressor having a pair of pumping chambers, means extending into said pumping chambers for displacing lubricant therefrom, said means providing a lubricant conduit from one pumping chamber to the other, a cylinder intermediate said pumping chambers, packing glands between said cylinder and said pumping chambers, a piston in said cylinder for reciprocating said lubricant displacing means, a pump for supplying primary fluid alternatively at opposite sides of the piston for operating the piston in either direction, and an automatic reversing valve for shifting the application of the primary fluid from one side of the piston to the other.

6. A lubricating system of the class described, comprising a compressor having a pair of lubricant pumping chambers, means extending into said pumping chambers for displacing lubricant therefrom, said means providing a conduit for lubricant from one pumping chamber to the other, a cylinder intermediate said pumping chambers, a piston in said cylinder for reciprocating said means, a pump for delivering primary fluid to operate said piston in both directions, a motor for driving said primary fluid pump, conduits connecting said pump with opposite ends of said cylinder, and an automatic reversing valve controlling the application of primary fluid to said piston.

7. A lubricating system of the class described, comprising a compressor having a pair of lubricant pumping chambers, means extending into said pumping chambers for displacing lubricant therefrom, said means providing a conduit for lubricant from one pumping chamber to the other, a cylinder intermediate said pumping chambers, a piston in said cylinder for reciprocating said means, a pump for delivering primary fluid to operate said piston in both directions, a motor for driving said primary fluid pump, conduits connecting said pump with opposite ends of said cylinder, an automatic reversing valve controlling the application of primary fluid to said piston, a lubricant discharge conduit for said compressor, and means responsive to pressure in said discharge conduit for rendering said primary pump ineffective to operate said piston.

8. A lubricating system of the class described, comprising a compressor having a pair of lubricant pumping chambers, means extending into said pumping chambers for displacing lubricant therefrom, said means providing a conduit for lubricant from one pumping chamber to the other, a cylinder intermediate said pumping chambers, a piston in said cylinder for reciprocating said means, a pump for delivering primary fluid to operate said piston in both directions, a motor for driving said primary fluid pump, conduits connecting said pump with opposite ends of said cylinder, an automatic reversing valve controlling the application of primary fluid to said piston, a lubricant discharge conduit for said compressor, means responsive to pressure in said discharge conduit for rendering said primary pump ineffective to operate said piston, and a booster in said compressor adapted when the resistance in the discharge conduit reaches a predetermined maximum to come into action for substantially increasing the pressure on the lubricant for ejecting it.

9. A compressor of the class described, comprising a head, a first pumping chamber, a second pumping chamber, means extending into said pumping chambers for displacing material therefrom, means providing a lubricant conduit from one pumping chamber to the other, a cylinder intermediate said pumping chambers, a piston in said cylinder for reciprocating said means, and a booster movably mounted in said head and subject to the pressure of the material displaced from said pumping chambers over a selected area and transmitting such pressure to the material over a substantially smaller area for increasing the pressure for ejecting the material from the head.

10. A lubricating system of the type described, comprising in combination a pump, a lubricant compressor connected with said pump for operation by a stream of primary fluid driven by said pump so as to force a stream of lubricant through the compressor, a discharge conduit through which the lubricant is discharged from the compressor, a control valve for regulating the discharge of lubricant through the conduit, and means comprising a by-pass valve responsive to pressure variations in said discharge conduit and adapted when the pressure on the lubricant in said conduit reaches a predetermined maximum to shift the connections for diverting from the compressor the stream of primary fluid coming from the pump and for relieving almost completely the pressure on the primary fluid passing through the pump.

11. A lubricating system of the type described, comprising in combination a pump, a lubricant compressor connected with said pump for operation by a stream of primary fluid driven by said pump so as to force a stream of lubricant through the compressor, a discharge conduit through which the lubricant is discharged from the compressor, a control valve for regulating the discharge of lubricant through the conduit, means comprising a by-pass valve responsive to pressure variations in said discharge conduit and adapted when the pressure on the lubricant in said conduit reaches a predetermined maximum to shift the connections for diverting from the compressor the stream of primary fluid coming from the pump and relieving almost completely the pressure on the primary fluid passing through the pump, and yielding means adapted normally to hold said by-pass valve releasably in position for diverting the primary fluid from the compressor.

12. A lubricating system of the type described, comprising in combination a pump, a lubricant compressor connected with said pump for operation by a stream of primary fluid driven by said pump so as to force a stream of lubricant through the compressor, a discharge conduit through which the lubricant is discharged from the compressor, a control valve for regulating the discharge of lubricant through the conduit, means comprising a by-pass valve responsive to pressure variations in said discharge conduit and adapted when the pressure on the lubricant in said conduit reaches a predetermined maximum to shift the connections for diverting from the compressor the stream of primary fluid coming from the pump and for relieving almost completely the pressure on the primary fluid passing through the pump, a spring normally opposing movement of the control parts into position for diverting the primary fluid from the compressor, and spring operated resistance means adapted normally to hold said control parts releasably from movement either into or out of position for causing the diversion of the primary fluid from the compressor.

13. A lubricating system of the class described, comprising a primary fluid pump, a lubricant compressor having piston means therein, means connecting said pump to said compressor for movement of said piston means in both directions by the pressure of the primary fluid discharged from the pump and comprising conduits leading from the pressure supplying discharge of the pump to opposite sides respectively of the piston means, and an automatic reversing valve actuated by the increased pressure in one of said conduits when the piston means has traveled to the limit of its motion in one direction to shift the pressure supplying connection of the pump to the other conduit and actuated in turn by the increased pressure in said other conduit when the piston means has traveled to the limit of its motion in the opposite direction to shift the pressure supplying connection of the pump back to said one conduit.

14. A lubricating system of the class described, comprising a primary fluid pump, a lubricant compressor having piston means therein, means connecting said pump to said compressor for movement of said piston means by the primary fluid discharged from the pump and comprising conduits leading from the pressure supplying discharge of the pump to opposite sides respectively of the piston means, an automatic reversing valve actuated by the pressure in said conduits adapted when the pressure in the active conduit builds up to a predetermined maximum to shift the pressure supplying connection of the pump to the other conduit, and resistance means connected with said reversing valve adapted yieldingly to resist the movement of said valve for shifting the connection from either of the conduits to the other.

GEO. H. PALM.

REFERENCES CITED

The following references are of record in the file of this patent:

UNITED STATES PATENTS

| Number | Name | Date |
| --- | --- | --- |
| 2,276,358 | Vickers | Mar. 17, 1942 |
| 2,022,232 | Davis | Nov. 26, 1935 |
| 2,289,567 | Berglund | July 14, 1943 |
| 1,722,412 | Eisenhauer | July 30, 1929 |
| 278,018 | Hudson | May 22, 1883 |
| 2,312,857 | Woelfer | Mar. 2, 1943 |
| 2,056,204 | Noack | Oct. 6, 1936 |
| 1,816,157 | Scott | July 28, 1931 |
| 2,287,709 | Ringman | June 23, 1942 |
| 2,217,880 | Woodson | Oct. 15, 1940 |
| 1,770,912 | Clapp | July 22, 1930 |
| 2,240,901 | Ferris | May 6, 1941 |
| 2,380,608 | Palm | July 31, 1945 |